Nov. 21, 1933.        O. F. PERSSON            1,936,408
                      ELECTRODE HOLDER
                      Filed Aug. 19, 1931
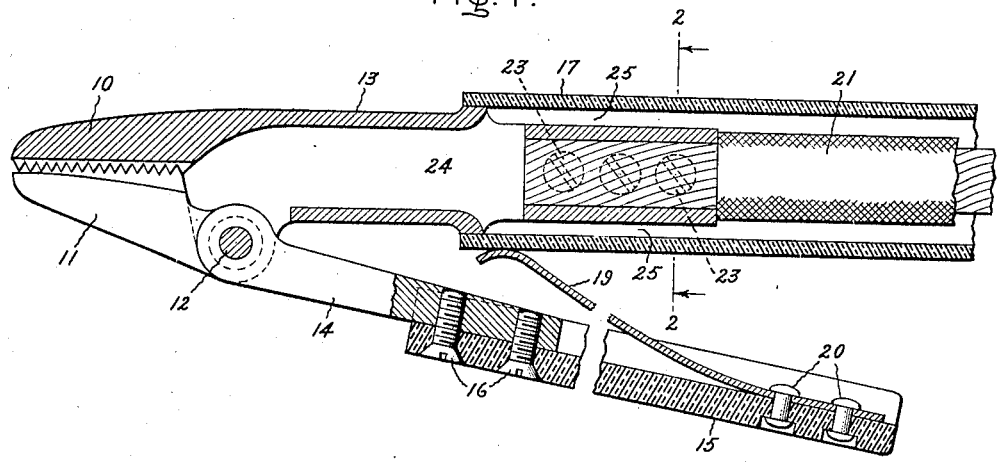
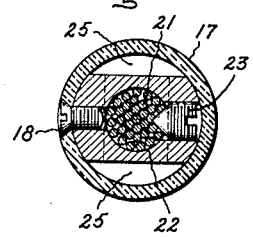
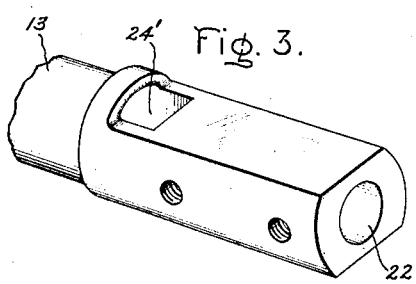
Inventor:
Otto F. Persson,
by Charles E. Tullar.
His Attorney.

Patented Nov. 21, 1933

1,936,408

UNITED STATES PATENT OFFICE 1,936,408

ELECTRODE HOLDER

Otto F. Persson, Saugus, Mass., assignor to General Electric Company, a corporation of New York Application August 19, 1931. Serial No. 558,089

4 Claims. (Cl. 219—8)

My invention relates to electrode holders for use in arc welding operations.

It is an object of my invention to provide an electrode holder embodying an improved ventilating arrangement by means of which the handle of the holder is kept cool through the circulation of air through it.

The various objects and features of my invention will be better understood from a consideration of the following description taken in connection with the accompanying drawing in which Fig. 1 shows a side view, partly in section, of an electrode holder embodying my invention; Fig. 2 shows a sectional view taken along the lines 2—2 of Fig. 1, and Fig. 3 shows a perspective view of the handle supporting portion of the shank of the main jaw of the electrode holder of Fig. 1.

The electrode holder shown in Fig. 1 comprises a plurality of jaw members 10 and 11 pivotally connected to one another by a pin 12. Each of these jaw members is provided with shanks 13 and 14. Shank 14 supports a finger piece 15 which is attached thereto by screws 16, and shank 13 supports a handle 17 which is held in place by screws 18 (Fig. 2). Jaw members 10 and 11 are biased into engagement with one another by means of a leaf spring 19, one end of which is rigidly attached to the finger piece 15 by rivets 20 and the other end of which slidably engages the external surface of the handle 17. Handle 17 and finger piece 15 are formed of electric and heat insulating material and by attaching the spring in the manner described, it is adequately protected against heating through conduction or internal heat generated by the flow of current therethrough. Shank 13 is also provided with means for attaching thereto an electrical conductor 21 through which welding current is supplied to the electrode holder. In the particular holder illustrated this means comprises a recess 22 formed in the handle portion of the shank 13 into which the conductor is inserted and held in place by set screws 23 (Fig. 2).

The shank 13 of the main jaw 10 is provided with an enclosed ventilating duct 24 extending therethrough. It will be noted that in the electrode holder illustrated the inside diameter of the handle 17 is larger than the outside diameter of the conductor 21. This construction is intentionally resorted to in order to provide a ventilating duct through the handle. The ventilating duct in the lug 13 communicates with the ventilating duct in the handle 17 through ports 24' and passageways 25 formed between the handle and terminal portion of the lug 13, thus providing a continuous ventilating passageway from the end of the handle into which the conductor 21 extends through the handle and lug 13 to the jaws 10 and 11 of the holder.

In performing a welding operation an electrode is inserted between the jaws 10 and 11 by first depressing the finger piece 15 to separate the jaws for the insertion of the electrode and thereafter releasing the finger piece 15 to permit the jaws to close on the electrode. The clamping pressure for holding the electrode in place is provided through the agency of spring 19 acting on the lugs attached to these jaw members. During the welding operation the jaw members 10 and 11 become heated due to the heating effect of the current flowing through them and into the welding electrode, and due to the heat radiated from the welding arc, and this heating produces convection currents in the air surrounding the jaw members. The flow of air from the jaw members sucks air through the ventilating ducts in handle 17 and shank 13, and thereby produces a flow of cooling air through the handle and shank of the electrode holder. This flow of air adequately cools the handle 17 and shank 13 and prevents any substantial amount of heat flowing back to the handle from the jaw members 10 and 11. This sucking or aspirator action will be produced irrespective of the operating position of the electrode holder since in whatever position it is held convection currents will be generated which will flow away from the welding jaws 10 and 11, and thereby induce a flow of air through the handle 17 and shank 13.

My invention is not limited to electrode holders of the jaw type, but is applicable to any type of electrode holder. Thus, while I have shown a preferred form of my invention, I wish it to be understood that the general structure, combination and arrangement of parts may be changed by those skilled in the art without departing from the spirit of my invention.

What I claim as new and desire to secure by Letters Patent of the United States is:

1. An electrode holder comprising jaw members, one of which is provided with a shank having an enclosed ventilating duct extending therethrough to said jaw members, and a handle mounted on the end of said shank and having a ventilating duct therein communicating with the ventilating duct in said shank.

2. An electrode holder comprising jaw members, a handle having a ventilating duct therein, and a connection between said handle and one of said jaw members said connection having an enclosed passageway therein extending from said jaw members to said ventilating duct.

3. An electrode holder comprising jaw members, one of which is provided with a shank having an enclosed passageway extending therethrough to said jaw members, means for connecting a conductor to said shank and a tubular handle attached to the end of said shank and forming a continuation of the enclosed passageway in said shank, said handle having an inside diameter larger than the conductor extending therethrough to said shank.

4. An electrode holder comprising jaw members, means for pivotally connecting said members, shanks attached to said members and extending beyond said connecting means, means disposed between said shanks for forcing them apart, and a handle attached to the end of one of said shanks, said handle and said shank having a ventilating duct extending therethrough to said jaw members.

OTTO F. PERSSON.